Patented Nov. 12, 1940

2,220,950

UNITED STATES PATENT OFFICE 2,220,950

WATER TREATMENT

Paul G. Bird, Western Springs, Ill.

No Drawing. Application March 11, 1937,
Serial No. 130,309

12 Claims. (Cl. 210—23)

The present invention relates to an improved method and composition for preventing the formation of adherent deposits from water that has been treated with water-softening chemicals.

One of the objects of the invention is to treat water with water-softening chemicals, containing sodium aluminate as one of its constituents, and so to effect the treatment that the formation of adherent deposits on the surfaces of pipes and conduits will be prevented while the thus treated water is being conducted to the boiler or other tank in which it is used.

A further object of the invention relates to the conjoint use of two different types of tannin, which mutually act upon each other to prevent the formation of adherent deposits.

Still a further object of the invention is the use of a mixture of hemlock and chestnut tannins in a composition for treating water. The invention also relates to the compositions employed for this purpose.

In the treatment of water, it has already been proposed to use a composition containing soda ash, sodium hydroxide, tannin, dextrin, sodium phosphate, and sodium aluminate, having the following formula:

| | Per cent |
|---|---|
| Soda ash | 67.2 |
| Sodium hydroxide | 5.2 |
| Tannin | 20.1 |
| Dextrin | 2.9 |
| Sodium phosphate | 2.7 |
| Sodium aluminate | 1.9 |

But in this composition the tannin employed has been what is known as commercial chestnut tannin. When using this, however, it was found that, even though the water was otherwise satisfactorily treated, a few hours after the treatment, even when standing at room temperatures, there would separate from the water a rather heavy flock. This heavy flock is of rather indefinite composition but is composed, at least in part, of aluminum hydroxide in various states of hydration and includes complex compounds formed from the salts contained in the water. The formation of such flock, however, is undesirable, and therefore one of the objects of the invention is to prevent a formation of an excessive amount of such flock.

It has now been found that if for the chestnut tannin in the above composition a tannin made from hemlock is substituted, practically no precipitate will form, even after considerable periods of time at room temperatures. Thus, for example, water which was treated with 12.93 grains of the above composition per gallon of water contained 0.14 grain per gallon of alumina. When chestnut tannin was used in the composition, the residual alumina contained in the treated water at the end of thirty hours had fallen to 0.03 grain per gallon, the rest of the alumina having been precipitated as a flock containing calcium and other salts combined with the alumina. On the contrary, however, when hemlock tannin was used, the alumina content of the water was 0.13 grain per gallon at the end of thirty hours; thus only 0.01 grain per gallon of alumina had been lost from the solution in the form of a flock.

It has, however, been discovered that when hemlock tannin is used in place of the chestnut tannin, the precipitate which forms, though very slight in amount, is very adherent and tends to incrust pipe-lines, tanks, etc., in which the water is used, while on the contrary the rather large amount of precipitate produced when chestnut tannin is used is of a non-adhering nature. It is very desirable to prevent the formation of the flock, but it is even more desirable to prevent its adhesion to tanks, pipe-lines, etc.

The discovery has now been made that the desired end may be obtained by using mixture of commercial hemlock tannin and commercial chestnut tannin in making up a composition of the nature of that above described. Under such circumstances there is a very slight precipitate, and the precipitate is non-adherent. In other words, the chestnut tannin renders the precipitate non-adherent, while the hemlock tannin tends to prevent the formation of the precipitate in the first place.

In order to illustrate what the effect would be when using only hemlock tannin in the formula hereinabove reproduced, it was found that large quantities of alumina could be held in solution thereby. For example, 0.42 grain of alumina were added to water in the use of the composition, using only hemlock tannin, and at the end of twenty hours there still remained 0.35 grain in solution. In another test 0.28 grain of alumina were added and 0.26 grain remained in solution after twenty hours.

The effect can be visually followed as well. Thus when the tannin employed is a chestnut tannin, practically all of the color imparted to the water thereby will be precipitated, and the tannin will form a part of the resulting flocculent precipitate. If, on the contrary, hemlock tannin is used, the water remains colored. When using both tannins, there is a slight precipitate, but it is non-adherent. The hemlock tannin, therefore, has the function of preventing the formation of flocculent precipitates, while the chestnut tannin aids in preventing that precipitate which does form from being adherent.

In order to carry out the present invention on a commercial basis, it has been found highly advantageous to make up two compositions which are to be used conjointly. These compositions may have the following formulas, which however are given as purely illustrative and are not to be taken as a limitation on the invention as herein disclosed. Thus, Composition A may consist of the following:

| | Per cent |
|---|---|
| Soda ash | 64.0 |
| Liquid caustic soda (50%) | 6.4 |
| Sodium metaphosphate | 7.5 |
| Sodium aluminate | 5.4 |
| Dextrine | 8.1 |
| Water | 8.6 | while Composition B may have the following formula:

| | Per cent |
|---|---|
| Soda ash | 74.0 |
| Caustic soda | 5.1 |
| Liquid chestnut tannin | 11.5 |
| Powdered hemlock tannin | 4.3 |
| Liquid hemlock tannin | 5.1 |

In the above Formula B the liquid tannin has a total solids content of about 50%. These compositions are preferably mixed so as to form a damp coherent mass which is then mechanically molded in a suitable press into the form of a ball, brick, or other suitable shape, whereafter it is allowed to set and dry, thus forming a coherent mass.

When treating water in accordance with the present invention, it is advisable to employ one of the balls made with Formula A and two of the balls made with Formula B, although this of course may be varied. The water is allowed to contact these balls, as for example by being allowed to flow over them. The essential feature is, however, the conjoint use of the chestnut as well as the hemlock tannin, so that the benefits of the presence of both tannins may be obtained. The chestunt tannin will prevent any precipitate formed from being adherent while the hemlock tannin inhibits the formation of the precipitate in the first place. The result therefore is not merely cumulative, because it is thus definitely established that the two tannins mutually react with each other to produce the desired effect.

It will at once be appreciated by those skilled in the art of water treatment that these results are unexpected and are of considerable value in the treatment of water with a composition of the nature hereinabove described.

I claim:

1. The process of inhibiting the separation of precipitate from slightly alkaline treated water containing aluminum compounds which comprises adding a small amount of hemlock tannin thereto.

2. The process of preventing the separation of adherent precipitates from slightly alkaline treated water containing aluminum compounds which comprises adding a small amount of a mixture of chestnut tannin and hemlock tannin thereto.

3. The process of inhibiting the adherence of precipitated materials to surfaces when said materials are precipitated from slightly alkaline softened water containing alumina which comprises carrying out the formation of said precipitates in the presence of hemlock and chestnut tannins in the water.

4. The process of treating water which comprises forming alumina-containing precipitates therein by adding a water-treating compound containing sodium aluminate and inhibiting the precipitation from the treated water of adherent precipitates by carrying out the treatment in the presence of hemlock tannin and chestnut tannin in the water.

5. The process of treating water which comprises forming alumina-containing precipitates therein by adding a water-treating compound containing sodium aluminate and inhibiting the precipitation of deposits from the thus treated water by carrying out the treatment in the presence of hemlock tanning therein.

6. A composition for treating hard water to cause delayed precipitation therein comprising sodium carbonate, sodium hydroxide, sodium aluminate, and hemlock tannin.

7. A composition for treating hard water to cause delayed precipitation therein comprising sodium carbonate, sodium hydroxide, sodium aluminate, and a mixture of hemlock and chestnut tannin.

8. A composition for preventing the adhesion of precipitated materials to the surface of pipes, containers, tanks, etc., which comprises a mixture of sodium aluminate, chestnut tannin and hemlock tannin.

9. A process for softening water which comprises adding sodium carbonate, sodium hydroxide, sodium aluminate, and hemlock tannin thereto.

10. A process for minimizing the amount of scale forming precipitate produced from hard water previous to heating to elevated temperatures which comprises adding sodium carbonate, sodium hydroxide, sodium aluminate, hemlock tannin, and chestnut tannin to said water.

11. A process for treating hard waters which comprises adding sodium carbonate, sodium hydroxide, and sodium aluminate thereto and separately adding a composition comprising hemlock tannin and chestnut tannin.

12. A composition for treating hard water to cause delayed precipitation therein, said composition comprising a major proportion of sodium carbonate, a small proportion of sodium aluminate, a small proportion of hemlock tannin, and a small proportion of chestnut tannin.

PAUL G. BIRD.